(12) United States Patent
Hakoda et al.

(10) Patent No.: US 8,244,397 B2
(45) Date of Patent: *Aug. 14, 2012

(54) METHOD FOR CONTROLLING MOLD CLAMPING DEVICE

(75) Inventors: Takashi Hakoda, Nagano-ken (JP); Isamu Komamura, Nagano-ken (JP); Haruo Okada, Nagano-ken (JP); Kiyoshi Nakamura, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 580 days.

This patent is subject to a terminal disclaimer.

(21) Appl. No.: 12/392,784

(22) Filed: Feb. 25, 2009

(65) Prior Publication Data

US 2009/0212453 A1 Aug. 27, 2009

(30) Foreign Application Priority Data

Feb. 26, 2008 (JP) .................................. 2008-044767

(51) Int. Cl.
*B29C 45/03* (2006.01)
(52) U.S. Cl. .................. 700/200; 264/40.5; 425/150
(58) Field of Classification Search .................. 264/40.7; 425/150
See application file for complete search history.

(56) References Cited

U.S. PATENT DOCUMENTS

| | | | | |
|---|---|---|---|---|
| 5,219,584 A | * | 6/1993 | Itsuzi et al. | 425/150 |
| 5,514,311 A | * | 5/1996 | Shimizu et al. | 264/40.1 |
| 5,863,475 A | * | 1/1999 | Ueda | 264/40.5 |
| 7,798,799 B2 | * | 9/2010 | Shiozawa et al. | 425/149 |

FOREIGN PATENT DOCUMENTS

JP 10-119102 A 5/1998

OTHER PUBLICATIONS

Hydraulik, "D 7960 E Variable Displacement Axial Piston Pump" Catalog, Hawe Hydraulik GMBH & Company, Muchen, DE, Mar. 2006.*

* cited by examiner

*Primary Examiner* — Kakali Chaki
*Assistant Examiner* — Walter Hanchak
(74) *Attorney, Agent, or Firm* — Birch, Stewart, Kolasch & Birch, LLP (57) ABSTRACT

A predetermined speed control pattern B is set. In a mold clamping process, in a mold closing section Zm, mold closing control is performed at a mold closing speed Vm, and based on a current mold closing speed Vd and a current mold closing position Xd, which are both detected, a deceleration starting position Xmc of the deceleration section Zmd, where the current mold closing speed Vd becomes a zero (O) at a virtual stop position Xc, is sequentially forecasted at each predetermined time interval by calculation. Upon reaching the deceleration starting position Xmc the deceleration section Zmd is started, and in the deceleration section Zmd, based on the detected current mold closing position Xd, a speed command value Dm corresponding to the speed control pattern B is obtained sequentially by calculation, and according to the speed command value Dm deceleration control is performed. Upon reaching a mold clamping-transition speed Vc, a predetermined mold clamping processing is performed via a low-pressure low-speed section Zc.

10 Claims, 4 Drawing Sheets

METHOD FOR CONTROLLING MOLD CLAMPING DEVICE

TECHNICAL FIELD

This invention relates to a method for controlling a mold clamping device which performs mold clamping control by driving a mold clamping cylinder by a hydraulic pump.

BACKGROUND ART

Generally, a hydraulic-type injection molding machine has an aspect that it is difficult to precisely control a position and a speed compared to an electromotive-type injection molding machine. In other words, in the case of the hydraulic type, as it uses hydraulic oil and a hydraulic actuator, viscosity, volume, and the like of the hydraulic oil changes according to temperature, and an inertial force is generated in the hydraulic actuator. These physical behaviors directly affect the control precision and responsiveness. In the case where, as a hydraulic pump, a variable discharge type hydraulic pump capable of controlling a discharge flow rate by varying the number of revolutions of a drive motor is used, length of the hydraulic circuit from the hydraulic pump to the hydraulic actuator gets longer, thereby influence of changes in viscosity, volume, and the like of the hydraulic oil being larger. When supposing, as a hydraulic actuator, for example, a mold clamping cylinder equipped in a mold clamping device, even though feedback control is carried out for the positions, mold clamping positions (mold closing positions) or mold closing time periods largely vary among shots, causing a trouble such as breakage and damage from colliding a movable mold with a fixed mold. This problem is more serious, when a mold closing speed is increased to shorten a mold closing time period (molding cycle time) in order to increase productivity.

Meanwhile, hitherto, a control method which aims at increasing a mold closing speed while preventing molds from colliding each other is known. JP 10-119102 A (Patent literature 1) discloses a method for controlling hydraulic pressure of a mold clamping device. In the method, a discharging pipeline communicated and connected with a variable displacement pump and a draw-off pipeline communicated and connected with a tank are respectively connected to cylinder pressure chambers, which are partitioned on both sides of a piston of a mold clamping cylinder, through a direction switching valve so as to selectively communicate therewith. On the discharging pipeline a solenoid proportional switching valve for controlling a discharge flow rate of the variable displacement pump is arranged and on the draw-off pipeline a brake valve and a throttle are arranged in parallel. It is so adapted that, when a position where the molds approach each other is detected, the solenoid proportional switching valve is so switched as to switch the operation of the mold clamping cylinder from a high speed to a low speed and the brake valve is switched so as to perform brake operation. Furthermore, a traveling speed of the molds by the mold clamping cylinder is detected. In switching the operation of the mold clamping cylinder from a high speed to a low speed, at the time when the speed is decreased by a required percentage from a traveling speed of the high speed, the brake valve is switched.

SUMMARY OF INVENTION

Technical Problem

However, the abovementioned method for controlling a mold clamping device in the past (the method for controlling hydraulic pressure) has the following problems.

Firstly, in the method, a position where the molds approach each other is detected, the solenoid proportional switching valve is so switched as to switch the operation of the mold clamping cylinder from a high speed to a low speed and the brake valve is switched so as to perform braking operation. This prevents the molds from colliding with each other. However, variation in mold clamping positions (positions of closing the molds) and variation in mold closing time periods are larger among respective shots, causing a factor for lowering molding quality (homogenization) and a factor for changing productivity. In addition, in order to prevent the collision, it is necessary to arrange a sufficient low-pressure mold clamping section. Therefore, the cycle time cannot be shortened.

Secondly, since a brake valve and a circuit element related thereto (an additional part and the like) are necessary, these become a factor for increasing cost of a hydraulic system circuit and are significant as a factor for complicating the hydraulic system circuit and a factor for increasing the size thereof.

Solution to Problem

In order to solve the abovementioned problems, the method for controlling a mold clamping device $1c$ according to the present invention is characterized as follows: at the inception of performing mold clamping control by driving a mold clamping cylinder 3 by a hydraulic pump 2, preliminarily setting a predetermined speed control pattern B having, at least, a mold closing section Zm in which mold closing is performed at a predetermined mold closing speed Vm, a deceleration section Zmd in which the speed is gradually decelerated from an end point (Xmc) of the mold closing section Zm toward a virtual stop position Xc, and a low-pressure low-speed section Zc for which a predetermined mold clamping-transition speed Vc is set before the virtual stop position Xc; in a mold clamping process, in the mold closing section Zm, performing mold closing control at the mold closing speed Vm, and sequentially forecasted, based on a current mold closing speed Vd and a current mold closing position Xd, which are both detected, a deceleration starting position Xmc of the deceleration section Zmd where a current mold closing speed Vd becomes a zero (O) at the virtual stop position Xc, at each predetermined time interval; starting the deceleration section Zmd upon reaching the deceleration starting position Xmc, and in the deceleration section Zmd, obtaining, based on a detected current mold closing position Xd, a speed command value Dm corresponding to the speed control pattern B sequentially by calculation, and according to the speed command value Dm, performing deceleration control; and upon reaching a mold clamping-transition speed Vc, via a low-pressure low-speed section Zc, performing a predetermined mold clamping processing.

Advantageous Effects of Invention

The method for controlling a mold clamping device $1c$ according to the present invention exhibits the remarkable advantageous effects as follows.

(1) Even though viscosity, volume, and the like of the hydraulic oil in the hydraulic circuit are changed depending on temperature and an inertial force exists in the mold clamping cylinder 3, in controlling mold closing, the control is performed according to a preliminarily set speed control pattern B, thereby improving the control precision with respect to a mold clamping position (position of closing the molds) and thus reducing variation in the mold clamping positions and the mold closing time periods of respective shots drastically. Consequently, even when the mold clamping process is accelerated, collision of the molds is prevented, and thus trouble which may cause breakage and damage and the like can be avoided, and at the same time, a factor for lowering mold quality (homogenization) and a factor for changing productivity can be eliminated. In addition, conditions can be determined more simply without restriction caused by such troubles. And it was necessary to arrange a sufficient low-pressure mold clamping section for preventing the collision in the past. However, the present invention can surely decelerate the speed before starting the low-pressure mold clamping section, thereby the low-pressure mold clamping section can be set minimally, and thus contributing to shortening a cycle time (speedup).

(2) Since overrun of a mold (movable mold) is prevented by software processing, an additional hardware, for example, a brake valve and a circuit element related thereto required for braking operation are not necessary, thereby contributing to reducing the cost of the hydraulic system circuit and simplifying the circuit configuration and reducing the size thereof.

(3) According to a preferable mode of the invention, as a hydraulic pump 2, a variable discharge type hydraulic pump 2s, which is capable of controlling a discharge flow rate by varying the number of revolutions of the servomotor 11, is used, thereby to inverter control the hydraulic pump 2s, resulting in improvement in energy saving and a reduction in running costs. In addition, particularly, the control method according to the invention achieves a larger effect when it is applied to a mold clamping device 1c equipped with such a variable discharge type hydraulic pump 2s, which is largely affected by physical variation such as temperature in the hydraulic oil.

(4) According to a preferable mode of the invention, a sub-tank 13 is attached to the mold clamping cylinder 3, and in the mold closing section Zm and the deceleration section Zmd, such control is performed that the sub-tank 13 is connected to a rear oil chamber 3r of the mold clamping cylinder 3 so as for hydraulic oil in the sub-tank 13 to be flowed into the rear oil chamber 3r. Therefore, mold closing can be performed at higher speed and with higher responsiveness. Particularly, the control method according to the present invention is applied to such a mold clamping device 1c in which mold opening can be performed at higher speed and with higher responsiveness, thereby to achieve a larger effect.

(5) According to a preferable mode of the invention, in the deceleration section Zmd, a time period Td required for the deceleration section Zmd is set, and then the time period between the deceleration starting position Xmc of the deceleration section Zmd and the virtual stop position Xc is so controlled as to be the fixed required time period Td. This provides more stable and precise control with respect to the position and the speed on transiting to the mold clamping processing.

(6) According to a preferable mode of the invention, as the mold clamping processing, low-pressure mold clamping processing is performed at a low-pressure mold clamping speed Vs in a low-pressure mold clamping section Zps, and after this low-pressure mold clamping section Zps ends, high-pressure mold clamping processing is performed at a high-pressure mold clamping speed Vp, which is higher than the low-pressure mold clamping speed Vs, in a high-pressure mold clamping section Zpp. This makes it possible to perform the mold clamping processing smoothly and stably, and transit from the low-pressure low-speed section Zc to the mold clamping processing smoothly and stably.

(7) According to a preferable mode of the invention, the mold clamping-transition speed Vc is set within 0.1 to 0.6 times of the low-pressure mold clamping speed Vs. This optimizes controllability in transiting from the low-pressure low-speed section Zc to the low-pressure mold clamping section Zps.

(8) According to a preferable mode of the invention, in the low-pressure mold clamping section Zps, the mold clamping cylinder 3 is connected to the meter-out circuit 14 so as to perform meter-out control. With such meter-out control being performed, speed control in the low-pressure mold clamping section Zps, which is a relatively low speed section, can be performed stably and precisely.

DESCRIPTION OF EMBODIMENTS

The invention will now be described in greater detail with preferred embodiments of the invention and drawings attached. However, it should be appreciated that the drawings attached are given not to specify the invention, but to facilitate understanding of the invention. In addition, detail description of a well-known part of the invention is omitted to avoid that the invention becomes unclear.

Firstly, a configuration of a mold clamping device 1c arranged in an injection molding machine 1, by which the control method according to this embodiment can be implemented, will be explained, with reference to FIG. 3.

Figure 3:
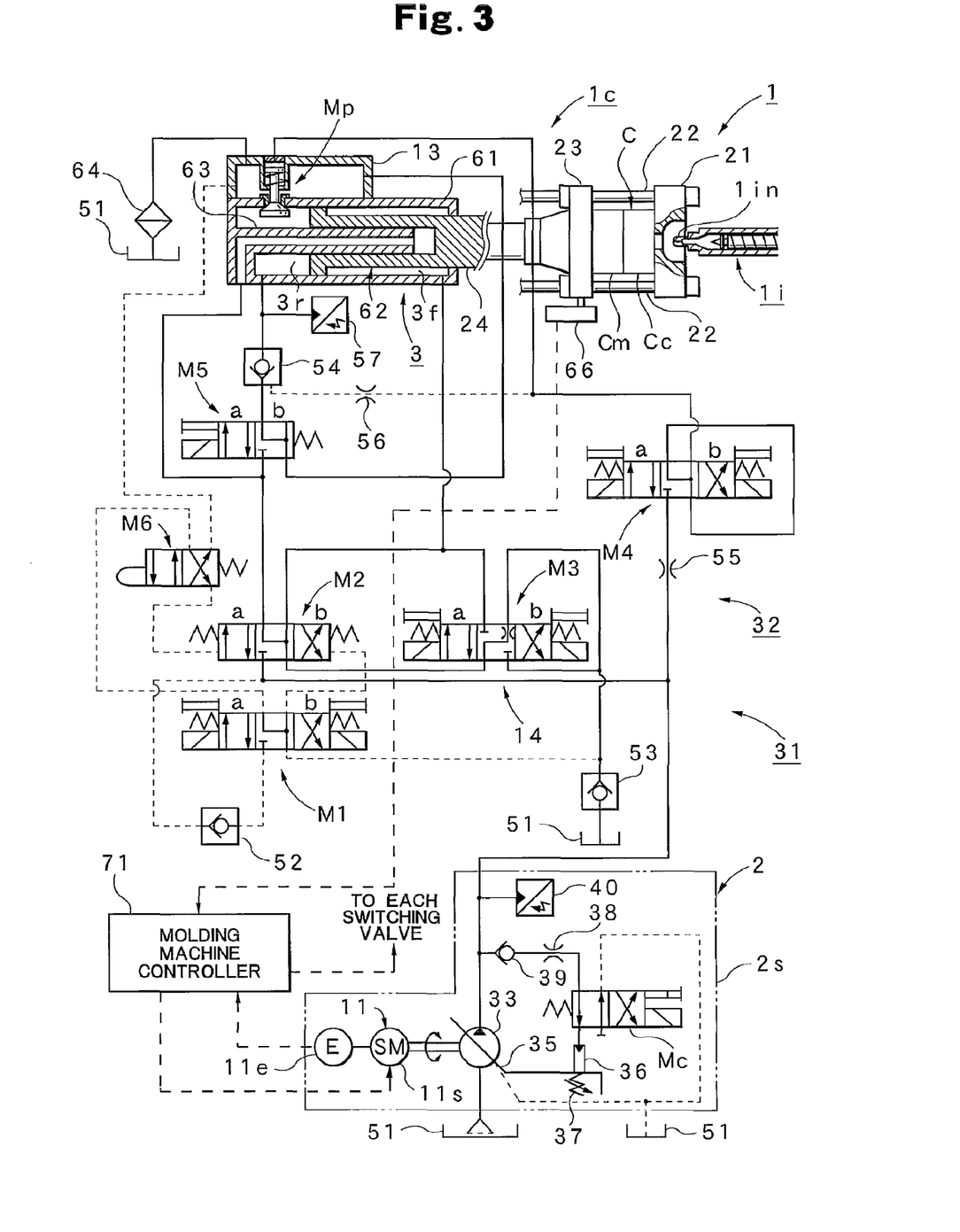
FIG. 3 shows a configuration of a mold clamping device capable of implementing the control method.

In FIG. 3, 1 designates an injection molding machine, which is provided with an injection device 1i and a mold clamping device 1c. The mold clamping device 1c has a fixed platen 21 which is fixed in a molding machine bed (not shown), and a plurality of tie bars 22 . . . which dispose from this fixed platen 21 to a pressure receiving platen (not shown), and a movable platen 23 which is slidably fitted to these tie bars 22 . . . . In addition, to the pressure receiving platen, a mold clamping cylinder 3 is fixed, and a piston 24 housed in the mold clamping cylinder 3 is coupled to the movable platen 23. A fixed mold Cc is mounted to the fixed platen 21, and a movable mold Cm is mounted to the movable platen 23. The fixed mold Cc and the movable mold Cm constitute a mold C. This allows drive controlling the mold clamping cylinder 3 to move the movable platen 23 (movable die Cm) forward or backward, thereby closing (mold clamping) or opening the mold C. Besides, the injection device 1i can inject and fill a melted resin in a cavity of the mold C by carrying out a nozzle touch with an injection nozzle 1 in on the mold C (fixed mold Cc).

Furthermore, the mold clamping device 1c is provided with a hydraulic drive part 31 including the mold clamping cylinder 3, and this hydraulic drive part 31 is controlled by a molding machine controller 71. The hydraulic drive part 31 is provided with a variable discharge type hydraulic pump 2s (hydraulic pump 2), which serves as a hydraulic drive source, and a hydraulic circuit 32. The hydraulic pump 2s has a pump body 33 and a servomotor 11s (drive motor 11) for rotationally driving the pump body 33. As the servomotor 11s, an AC servomotor connected to an output port of the molding machine controller 71 is used. To the servomotor 11s, a rotary encoder 11e for detecting the number of revolutions of the servomotor 11s is attached, and the rotary encoder 11e is connected to an input port of the molding machine controller 71.

Besides, the pump body 33 is composed of a swash plate type piston pump. Therefore, the pump body 33 has a swash plate 35. When an inclination angle of the swash plate 35 (swash plate angle) is larger, a stroke of the pump piston in the pump body 33 is larger, and then the discharge flow rate increases. When a swash plate angle is smaller, a stroke of the pump piston therein is smaller, and then the discharge flow rate decreases. Thus, by setting the swash plate angle at a predetermined angle, a fixed discharge flow rate, which means that a discharge flow rate is fixed at a predetermined rate, can be set. Furthermore, to the swash plate 35, a control cylinder 36 and a return spring 37 are attached. The control cylinder 36 is connected to a discharge port of the pump body 33 via a switching valve (solenoid valve) Mc, a throttle 38, and a check valve 39. This allows an angle of the swash plate 35 (swash plate angle) to be changed by controlling the control cylinder 36. Incidentally, 40 designates a pump pressure sensor.

An inlet port of the pump body 33 is connected to an oil tank 51 and the discharge port of the pump body 33 is connected to the hydraulic circuit 32. In this way, as a hydraulic pump 2, a variable discharge type hydraulic pump 2s, which is capable of controlling a discharge flow rate by varying the number of revolutions of the servomotor 11s, is used, thereby to inverter control the hydraulic pump 2s, resulting in improvement in energy saving and a reduction in running costs. In addition, particularly, the control method according to the invention achieves a larger effect when it is applied to a mold clamping device 1c equipped with such a variable discharge type hydraulic pump 2s, which is largely affected by physical variation such as temperature in the hydraulic oil.

The hydraulic circuit 32, as shown in FIG. 3, is equipped with a pilot switching valve (solenoid valve) M1 for switching the main operations, a direction switching valve M2, a direction switching valve (solenoid valve) M3 in which a throttle is housed, a switching valve (solenoid valve) M4 for switching a prefill valve Mp arranged in a sub-tank 13, which will be mentioned later, a switching valve (solenoid valve) M5 for switching the mold clamping operations, and a switching valve M6 forming a safety circuit. The hydraulic circuit 32 is connected in such a way shown in FIG. 3, to configure a hydraulic system circuit. Incidentally, 52, 53, 54 designate check valves, 55, 56 designate throttles, and 57 designates a cylinder pressure sensor. Besides, the mold clamping cylinder 3 is provided with a cylinder body 61, and a piston 24 which is housed in the cylinder body 61. The piston 24 also serves as a high-speed cylinder part 62. A booster ram 63 forwardly projected from a rear end of the cylinder body 61 is inserted into the oil chamber of the high-speed cylinder part 62. Furthermore, a sub-tank 13 is attached to the cylinder body 61. Between the sub-tank 13 and a rear oil chamber 3r, a prefill valve Mp for connecting and disconnecting the sub-tank 13 and rear oil chamber 3r is arranged, and the sub-tank 13 is connected to an oil tank 51 via an oil cooler 64. Thus, the mold clamping device 1c according to this embodiment forms a booster ram type mold clamping mechanism.

The hydraulic circuit 32 includes a meter-out circuit 14. The direction switching valve M3 mainly forms the meter-out circuit 14. Each of the switching valves M1, M3, M4, M5 . . . is connected to the output port of the molding machine controller 71. This allows each of the switching valves M1 . . . to be sequentially controlled by the molding machine controller 71. Furthermore, 66 designates a position sensor for detecting a position (mold position) of the movable mold Cm, and the position sensor 66 is connected to an input port of the molding machine controller 71.

Figure 1:
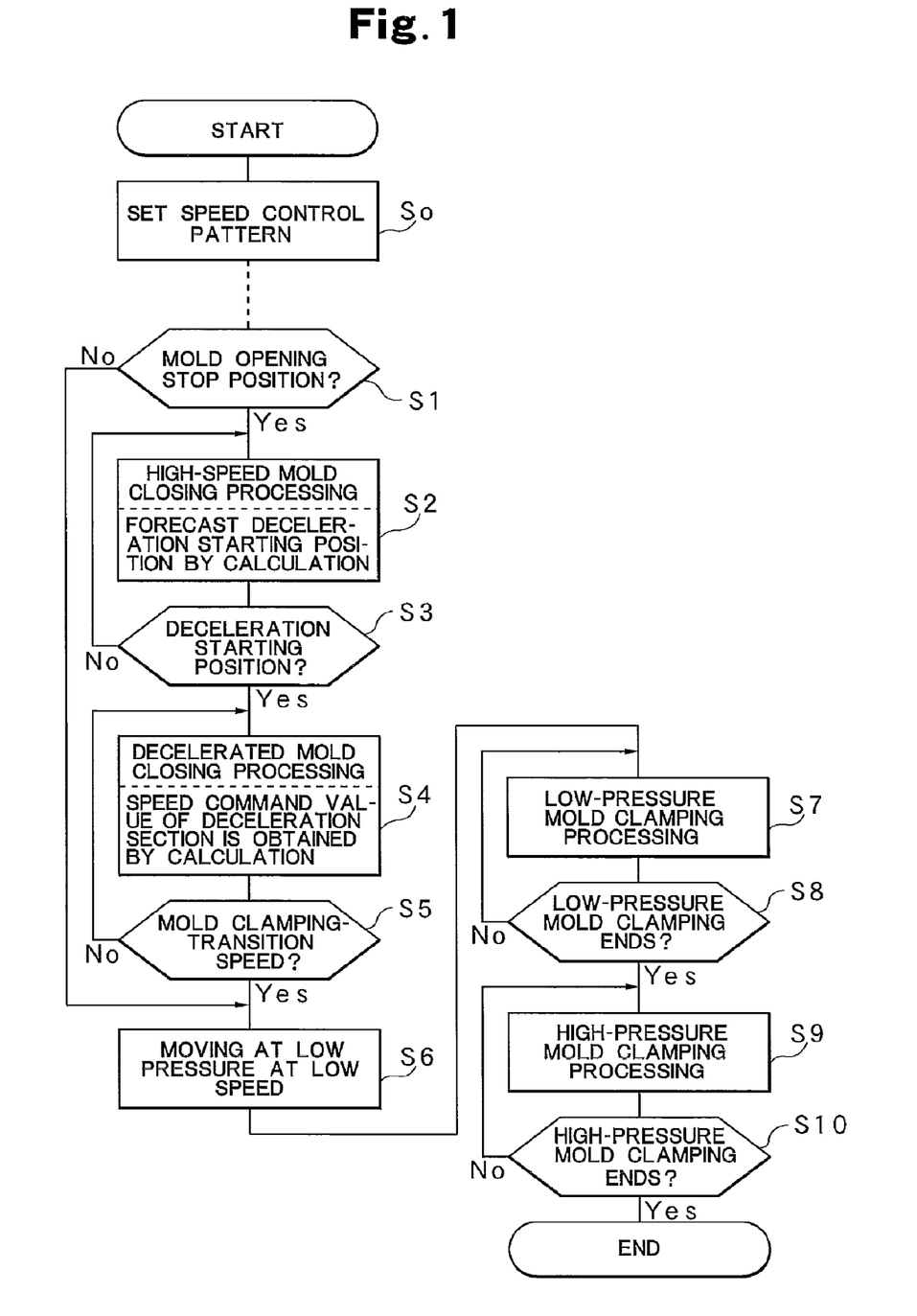
FIG. 1 is a flow chart for explaining a processing procedure of the control method according to a preferable embodiment of the present invention.

Now, the control method according to this embodiment, which includes a mold clamping operation of the mold clamping device 1c having such a configuration, will be explained according to the flow chart shown in FIG. 1, with reference to FIGS. 2 and 3.

Figure 2:
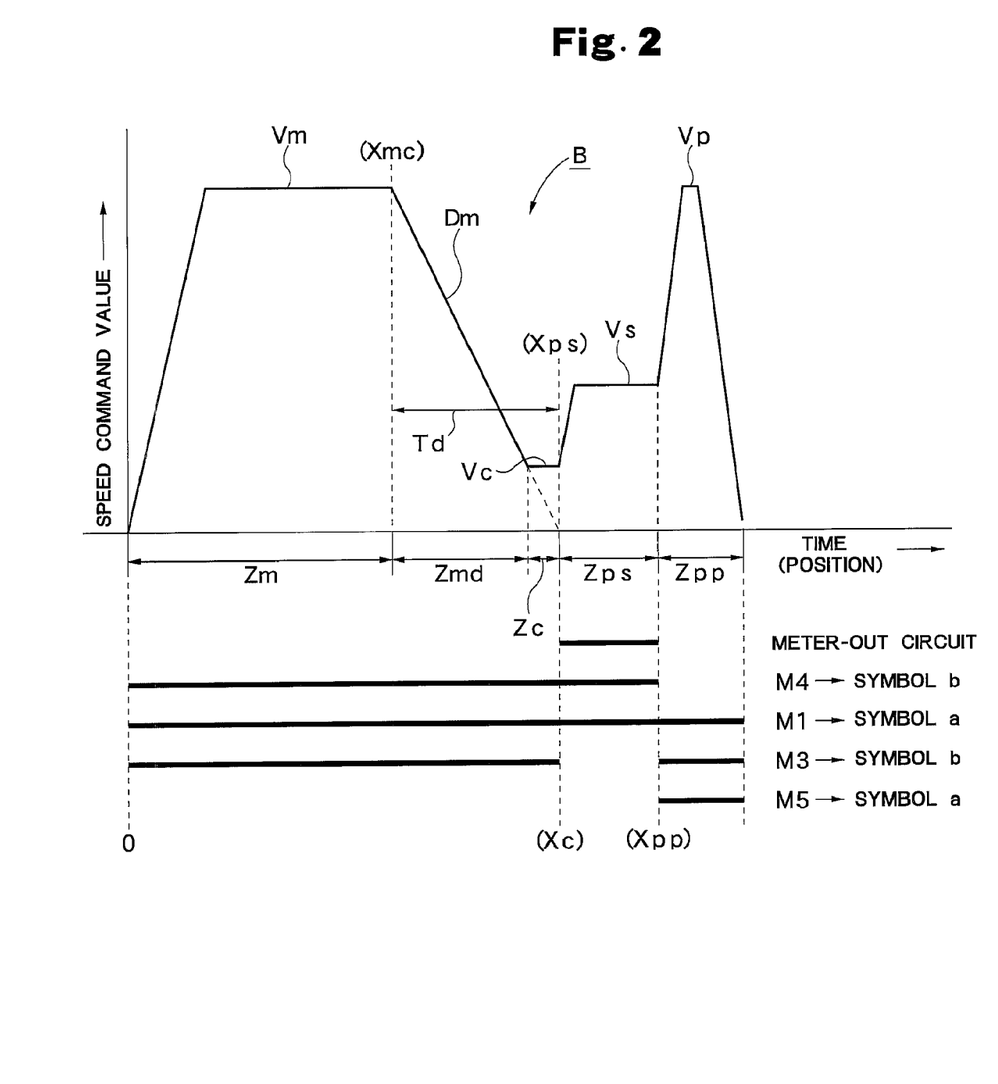
FIG. 2 shows a speed control pattern used for the control method.

Firstly, preliminarily, a speed control pattern B shown in FIG. 2 is set (Step So). The speed control pattern B includes at least a mold closing section Zm in which mold closing is performed at a predetermined mold closing speed Vm, a deceleration section Zmd in which the speed is gradually decelerated from the end point (Xmc) of the mold closing section Zm toward a virtual stop position Xc, and a low-pressure low-speed section Zc for which a predetermined mold clamping-transition speed Vc is set before the virtual stop position Xc. In the speed control pattern B, particularly, in the deceleration section Zmd, a time period Td required for the deceleration section Zmd is set and then a time period between the deceleration starting position Xmc of the deceleration section Zmd and the virtual stop position Xc is so controlled as to be the time period Td. Therefore, depending on an actual mold closing speed (current mold closing speed Vd), the end point position Xmc varies. Accordingly, in the case where the current mold closing speed Vd is higher than the set mold closing speed Vm, the end point position Xmc locates ahead of the end point position to be reached at the mold closing speed Vm, whereas in the case where the current mold closing speed Vd is lower than the mold closing speed Vm, the end point position Xmc locates behind the end position reached at the mold closing speed Vm. Thus, by controlling the time period between the deceleration starting position Xmc of the deceleration section Zmd and the virtual stop position Xc to be the fixed required time period Td, more stable and precise position control can be achieved with respect to the position and speed at the time of transiting to the mold clamping processing.

Besides, in the mold clamping processing, low-pressure mold clamping processing is performed at a set low-pressure mold clamping speed Vs in a low-pressure mold clamping section Zps. In order to perform a high-pressure mold clamping processing, after the low-pressure mold clamping section Zps ends, in high-pressure mold clamping section Zpp at a high-pressure mold clamping speed Vp which is set higher than the low-pressure mold clamping speed Vs, the stating points and the end points of the low-pressure mold clamping section Zps and the high-pressure mold clamping section Zpp are set in terms of position (or time), and the low-pressure mold clamping speed Vs and the high-pressure mold clamping speed Vp are set as speed command values.

Meanwhile, in the actual mold clamping process, the following mold clamping control is performed. Firstly, at the inception of the mold clamping process, a current position of the movable mold Cm is determined. In other words, it is determined whether or not the current mold opening position is in a normal mold opening stop position (including a permissible range) (Step S1). At this time, when the mold opening stop position is in the normal mold opening position, the mold clamping process is performed in a normal mode, in which the mold clamping process is started from this normal mold opening stop position.

Firstly, high-speed mold closing processing is performed at a high-speed mold closing speed Vm (Step S2). In this case, using the set mold closing speed Vm as a speed command value, the mold closing control in the mold closing section Zm shown in FIG. 2 is performed. In this mold closing control, in the hydraulic circuit 32 shown in FIG. 3, the switching valve M1 is switched to symbol a and the switching valves M3 and M4 are respectively switched to symbol b. By switching the switching valve M1 to symbol a, the switching valve M2 is switched to symbol a. Meanwhile, other switching valves M5, M6, Mc are maintained in the switching positions shown in FIG. 3. This allows hydraulic oil of the hydraulic pump 2 to be supplied to a high-speed cylinder part 62 via the switching valve M2, which moves the piston 24 forward thereby to close the molds at a high speed. Besides, hydraulic oil of the hydraulic pump 2 is applied to the prefill valve Mp via the switching valve M4, the prefill valve Mp is opened, and then hydraulic oil in the sub-tank 13 is flown into the rear oil chamber 3r of the mold clamping cylinder 3 and hydraulic oil in the front oil chamber 3f of the mold clamping cylinder 3 returns to the oil tank 51 through the switching valve M3. In this case, hydraulic oil in the sub-tank 13 is flown into the rear oil chamber 3r, which makes it possible to adapt to high-speed forward movement of the piston 24, and thereby to perform the mold closing at higher speed and with higher responsiveness. The control method according to the present invention is particularly applied to such a mold clamping device 1c in which mold closing can be performed at a higher speed and with higher responsiveness, to achieve a larger effect.

Furthermore, in the mold closing section Zm, based on a current mold closing speed Vd and a current mold closing position Xd, which are both detected, a deceleration starting position Xmc of the deceleration section Zmd where the current mold closing speed Vd becomes a zero (O) at a virtual stop position Xc is sequentially forecasted at each predetermined time interval and it is determined whether or not the deceleration starting position Xmc is reached. In other words, since the distance Lmd of the deceleration section Zmd is estimated to be Lmd=(Vd·Td)/2, when the condition of Xc−Lmd≦Xd is satisfied, it is determined that the deceleration starting position Xmc is reached, and then the deceleration section Zmd is started (Step S3). In the deceleration section Zmd, based on the detected current mold closing position Xd, a speed command value Dm corresponding to the deceleration section Zmd of the speed control pattern B is obtained sequentially by calculation. According to the speed command value Dm, decelerated mold closing processing is performed (Step S4). This decelerates the mold closing speed gradually. Incidentally, the speed command value Dm can be obtained by the following [Mathematical formula 1]. In [Math. 1], Vds is a current mold closing speed at the time of starting the deceleration section Zmd, Xps is a mold clamping start position after the low-pressure low-speed section Zc.

$$Dm = \sqrt{\frac{2 \cdot |Xps - Xd|}{Vds \cdot Td}} \cdot Vm \qquad \text{[Math. 1]}$$

Then, deceleration control is performed in the deceleration section Zmd. Once the current mold closing speed Vd is reached at a mold clamping-transition speed Vc, the mold clamping-transition speed Vc is maintained and low-pressure low-speed movement is performed (Step S5, S6). This mold clamping-transition speed Vc is set at a speed lower than the low-pressure mold clamping speed Vs in the low-pressure mold clamping section Zps, which is performed next. Specifically, the mold clamping-transition speed Vc is set about 0.1 to 0.6 times, more desirably about 0.25 to 0.5 times of the low-pressure mold clamping speed Vs. If the mold clamping-transition speed Vc is set within the range of 0.1 to 0.6 times of the low-pressure mold clamping speed Vs, controllability on transiting from the low-pressure low-speed section Zc to the low-pressure mold clamping section Zps can be optimized. This low-pressure low-speed movement is performed until reaching the mold clamping start position Xps. The section which is operated at the mold clamping-transition speed Vc is the low-pressure low-speed section Zc, thereby to be usable as a mold protecting section (foreign-matter detecting section).

Meanwhile, upon reaching the mold clamping start position Xps, the mold clamping processing is performed. In the mold clamping processing, firstly, the low-pressure mold clamping processing in the low-pressure mold clamping section Zps is performed (Step S7). In the low-pressure mold clamping section Zps, the mold clamping processing is performed at low pressure at a low pressure mold clamping speed Vs, which is a relatively low speed. In this case, in the low-pressure mold clamping section Zps, the switching valve M3 in the hydraulic circuit 32 is returned to the neutral position. According to this, hydraulic oil in the front oil chamber 3f of the mold clamping cylinder 3 is flown into the switching valve M3 via the switching valve M2, and then returned to the oil tank 51 through a throttle in the switching valve M3. In other words, meter-out control is performed by means of the meter-out circuit 14. With such meter-out control being performed, speed control in the low-pressure mold clamping section Zps, which is a relatively low speed section, can be performed stably and precisely.

Then, as the low-pressure mold clamping processing in the low-pressure mold clamping section Zps ends, the high-pressure mold clamping processing is performed in the high-pressure mold clamping section Zpp (Step S8, S9). In other words, upon reaching the high-pressure mold clamping start position Xpp, the mold clamping processing is performed at high pressure at a high-pressure mold clamping speed Vp, which is a relatively high speed. In this case, in the high-pressure mold clamping section Zpp, the switching valve M5 in the hydraulic circuit 32 is switched to symbol a and the switching valve M3 therein is switched to symbol b. This supplies hydraulic oil of the hydraulic pump 2 to the rear oil chamber 3r of the mold clamping cylinder 3 via the switching valves M2 and M5, thereby to move the piston 24 forward at high pressure. Meanwhile, the meter-out control by the meter-out circuit 14 is released. Accordingly, hydraulic oil in the front oil chamber 3f of the mold clamping cylinder 3 is returned to the oil tank 51 via the switching valves M2 and M3. As the high-pressure mold clamping processing ends in the high-pressure mold clamping section Zpp, the whole mold clamping process ends (Step S10).

In this way, as mold clamping processing, the low-pressure mold clamping processing is performed at a low-pressure mold clamping speed Vs in the low-pressure mold clamping section Zps, and after this low-pressure mold clamping section Zps, high-pressure mold clamping processing is performed at a high-pressure mold clamping speed Vp, which is higher than the low-pressure mold clamping speed Vs, in the high-pressure mold clamping section Zpp. This allows the mold clamping processing to be performed smoothly and stably, and transition from the low-pressure low-speed section Zc to the mold clamping processing to be made smoothly and stably.

Meanwhile, at the inception of the aforementioned mold clamping process, the current position of the movable mold Cm is determined. In the case where the current mold opening position does not exist in a normal mold opening stop position (including the permissible range), the mold clamping control is performed in a non-high-speed mold clamping mode in which the mold clamping process starts from the abovementioned low-pressure low-speed section Zc (Step S1, S6 . . . ). In other words, on starting the mold clamping process, if the position of the movable mold Cm does not exist in the normal mold opening stop position, it is considered that the movable mold Cm was manually stopped at an arbitrary position for maintenance, testing or the like, that mold closing was emergency-stopped before its completion when a safety door was opened, and so on. In this case, the process is jumped to Step 6 to start mold clamping control from the low-pressure low-speed section Zc, in which the operation is relatively slow.

Figure 4:
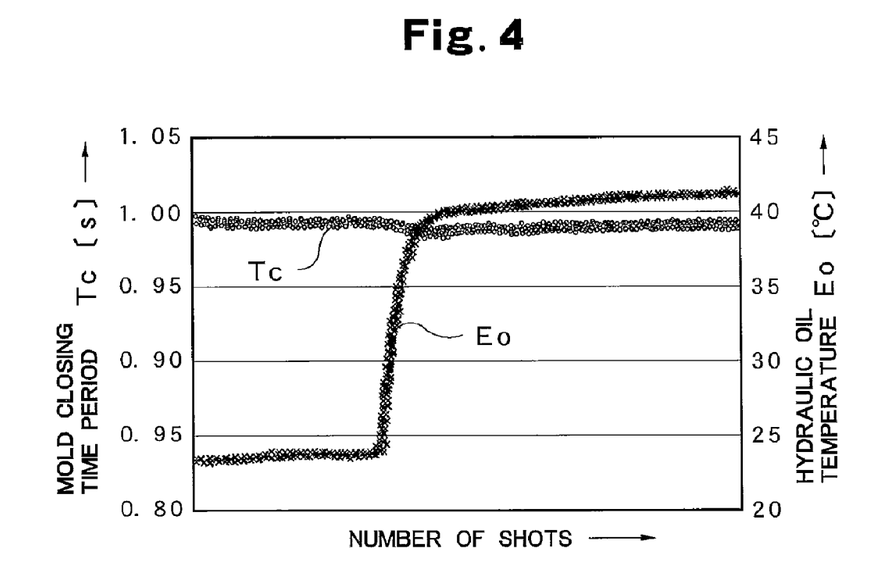
FIG. 4 shows temperatures of hydraulic oil and measurement data of the mold closing time periods for respective shots, when the control method according to the present invention is used.
Figure 5:
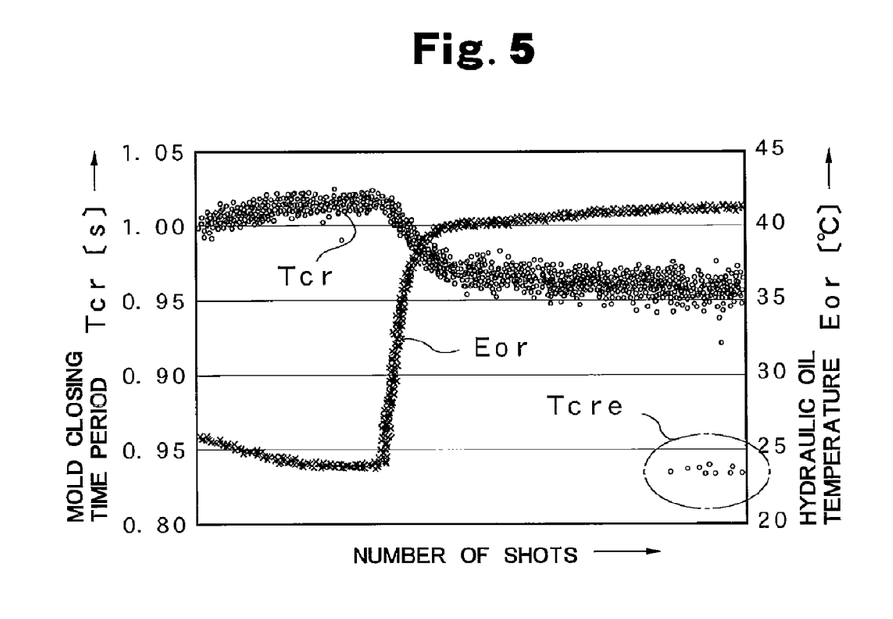
FIG. 5 shows temperatures of hydraulic oil and measurement data of the mold closing time periods for respective shots, when the control method according to the background art is used.

FIG. 4 shows the measurement data of mold closing time periods Tc for respective shots when the control method according to this embodiment is used and the temperature of the hydraulic oil Eo (° C.) is intentionally changed for 20° C. during sequential operation of the mold clamping device 1c (injection molding machine 1). In this case, the variation range is almost 0.018 seconds. For comparison purpose, FIG. 5 shows the measurement data of mold closing time periods Tcr for respective shots when the control method according to this embodiment is not used, but normal feedback control is performed based on a preliminarily set speed command value and the temperature of the hydraulic oil Eor (° C.) is intentionally changed for 20° C. during the sequential operation. In this case, the variation range is almost 0.202 seconds. Especially, in FIG. 5, the data enclosed by a dashed line indicate the shots in which the movable mold Cm and the fixed mold Cc are collided. Consequently, using the control method according to this embodiment surely prevents the movable mold Cm and the fixed mold Cc from colliding each other and allows the variation of the mold closing time periods Tc to be reduced almost by 1/11 comparing to a related-art technique.

In this way, by implementing the mold clamping process by the control method according to this embodiment, even though viscosity, volume, and the like of the hydraulic oil in the hydraulic circuit are changed depending on temperature and an inertial force exists in the mold clamping cylinder 3, in controlling the mold closing, the control is performed according to the preliminarily set speed control pattern B, thereby improving the control precision with respect to a mold clamping position (position of closing the molds) and thus reducing variation in the mold clamping positions and the mold closing time periods of respective shots drastically. Consequently, even when the mold clamping process is accelerated, collision of the molds is prevented, and thus a trouble which may cause breakage and damage and the like can be avoided, and at the same time, a factor for lowering mold quality (homogenization) and a factor for changing productivity can be eliminated. In addition, conditions can be determined more simply without restriction caused by such troubles. And since over-run of a mold (movable mold Cm) is prevented by software processing, an additional hardware, for example, a brake valve and a circuit element related thereto required for braking operation are not necessary, thereby contributing to reducing the cost of the hydraulic system circuit and simplifying the circuit configuration and reducing the size thereof.

While the preferable embodiment has been explained in detail, the present invention is not limited to such an embodiment, but in the detail of the hydraulic circuit configuration, techniques, numerical values and the like, any changes, additions, deletions may be made without departing from the spirit and scope of the inventions. For example, as a hydraulic pump 2, a variable discharge type hydraulic pump 2s is illustrated. However, this means that other types of hydraulic pumps 2 are not excluded. A speed control pattern B is not limited to the illustrated pattern, but various forms of patterns are applicable.

INDUSTRIAL APPLICABILITY

Although a mold clamping device 1c of an injection molding machine 1 is illustrated, the control method according to the present invention can be also employed for a mold clamping device in various industrial machines which uses a die (generally, a mold), such as an extruder.

REFERENCE SIGNS LIST

1c: Mold clamping device, 2: Hydraulic pump, 2s: Variable discharge type hydraulic pump, 3: Mold clamping cylinder, 3r: Rear oil chamber of mold clamping cylinder, 11: Drive motor, 13: Sub-tank, 14: Meter-out circuit, B: Speed control pattern, Zm: Mold closing section, Zmd: Deceleration section, Zc: Low-pressure low-speed section, Zps: Low-pressure mold clamping section, Zpp: High-pressure mold clamping section, Vm: Mold closing speed, Vc: Mold clamping-transition speed, Vs: Low-pressure mold clamping speed, Vp: High-pressure mold clamping speed, Xc: Virtual stop position, Xmc: Deceleration starting position, Dm: Speed command value, Td: Time period required for deceleration section

CITATION LIST

Patent Literature 1

JP 10-119102 A

The invention claimed is:

1. A method for controlling a mold clamping device which performs mold clamping control by driving a mold clamping cylinder by a hydraulic pump which can control a discharge control rate by variably controlling the number of revolutions of a drive motor, the method comprising:
   preliminarily setting a predetermined speed control pattern including, at least, a mold closing section in which mold closing is performed at a predetermined mold closing speed, a deceleration section in which the speed is gradually decelerated from an end point of the mold closing section toward a virtual stop position, and a low-pressure low-speed section for which a predetermined mold clamping-transition speed is set before the virtual stop position;
   in a mold clamping process, in the mold closing section, performing mold closing control at the mold closing speed, and sequentially forecasting, based on a current mold closing speed and a current mold closing position, which are both detected, a deceleration starting position of the deceleration section where a current mold closing speed becomes a zero (O) at the virtual stop position, at each predetermined time interval by calculation;
   starting the deceleration section upon reaching the deceleration starting position, and in the deceleration section, obtaining, based on the detected current mold closing position, a speed command value corresponding to the speed control pattern sequentially by calculation, and according to the speed command value, performing deceleration control; and
   upon reaching the mold clamping-transition speed, performing predetermined mold clamping processing via the low-pressure low-speed section,
   wherein a sub-tank is attached to the mold clamping cylinder, and in the mold closing section and the deceleration section, control in which the sub-tank is connected to a rear oil chamber of the mold clamping cylinder so as for hydraulic oil in the sub-tank to be flowed into the rear oil chamber, is performed.

2. The method for controlling a mold clamping device according to claim 1, wherein, as the drive motor, a servomotor to which a rotary encoder is attached is employed.

3. The method for controlling a mold clamping device according to claim 1, wherein, in the deceleration section, a time period required for the deceleration section is set, and then the time period between a deceleration starting position of the deceleration section and the virtual stop position is so controlled as to be the required time period.

4. The method for controlling a mold clamping device according to claim 1, wherein, as the mold clamping processing, low-pressure mold clamping processing is performed at a set low-pressure mold clamping speed in a low-pressure mold clamping section, and after this low-pressure mold clamping section ends, high-pressure mold clamping processing is performed at a high-pressure mold clamping speed, which is set higher than the low-pressure mold clamping speed, in a high-pressure mold clamping section.

5. The method for controlling a mold clamping device according to claim 4, wherein, in the low-pressure mold clamping processing, the mold clamping cylinder is connected to a meter-out circuit so as to perform meter-out control.

6. The method for controlling a mold clamping device according to claim 1, wherein the low-pressure low-speed section is used as a mold protecting section (foreign-matter detecting section).

7. The method for controlling a mold clamping device according to claim 1, wherein at the inception of the mold clamping process, it is determined whether or not a current position of a movable mold exists in a normal mold opening stop position (including a permissible range), and then if the movable mold exists in the normal mold opening stop position, the mold clamping process is performed in a normal mold clamping mode in which the mold clamping process starts from the normal mold opening stop position, whereas if the movable mold does not exist in the normal mold opening stop position, the mold clamping process is performed in a non-high-speed mold clamping mode in which the mold clamping process starts from the low-pressure low-speed section.

8. The method for controlling a mold clamping device according to claim 1, wherein the mold clamping device is arranged in an injection molding machine.

9. A method for controlling a mold clamping device which performs mold clamping control by driving a mold clamping cylinder by a hydraulic pump which can control a discharge control rate by variably controlling the number of revolutions of a drive motor, the method comprising:

preliminarily setting a predetermined speed control pattern including, at least, a mold closing section in which mold closing is performed at a predetermined mold closing speed, a deceleration section in which the speed is gradually decelerated from an end point of the mold closing section toward a virtual stop position, and a low-pressure low-speed section for which a predetermined mold clamping-transition speed is set before the virtual stop position;

in a mold clamping process, in the mold closing section, performing mold closing control at the mold closing speed, and sequentially forecasting, based on a current mold closing speed and a current mold closing position, which are both detected, a deceleration starting position of the deceleration section where a current mold closing speed becomes a zero (O) at the virtual stop position, at each predetermined time interval by calculation;

starting the deceleration section upon reaching the deceleration starting position, and in the deceleration section, obtaining, based on the detected current mold closing position, a speed command value corresponding to the speed control pattern sequentially by calculation, and according to the speed command value, performing deceleration control; and upon reaching the mold clamping-transition speed, performing predetermined mold clamping processing via the low-pressure low-speed section, wherein, in the deceleration section, a time period required for the deceleration section is set, and then the time period between a deceleration starting position of the deceleration section and the virtual stop position is so controlled as to be the required time period, and wherein distance (Lmd) of the deceleration section is estimated to be Lmd=(Vd·Td)/2 (wherein Vd is a detected current mold closing speed and Td is a time period required for the deceleration section), when the condition of Xc−Lmd≦Xd (wherein Xc is a virtual stop position and Xd is a detected current mold closing position) is satisfied, it is determined that the deceleration starting position is reached.

10. A method for controlling a mold clamping device which performs mold clamping control by driving a mold clamping cylinder by a hydraulic pump which can control a discharge control rate by variably controlling the number of revolutions of a drive motor, the method comprising:

preliminarily setting a predetermined speed control pattern including, at least, a mold closing section in which mold closing is performed at a predetermined mold closing speed, a deceleration section in which the speed is gradually decelerated from an end point of the mold closing section toward a virtual stop position, and a low-pressure low-speed section for which a predetermined mold clamping-transition speed is set before the virtual stop position;

in a mold clamping process, in the mold closing section, performing mold closing control at the mold closing speed, and sequentially forecasting, based on a current mold closing speed and a current mold closing position, which are both detected, a deceleration starting position of the deceleration section where a current mold closing speed becomes a zero (O) at the virtual stop position, at each predetermined time interval by calculation;

starting the deceleration section upon reaching the deceleration starting position, and in the deceleration section, obtaining, based on the detected current mold closing position, a speed command value corresponding to the speed control pattern sequentially by calculation, and according to the speed command value, performing deceleration control; and upon reaching the mold clamping-transition speed, performing predetermined mold clamping processing via the low-pressure low-speed section, wherein, in the deceleration section, a time period required for the deceleration section is set, and then the time period between a deceleration starting position of the deceleration section and the virtual stop position is so controlled as to be the required time period, and wherein the speed command value (Dm) is obtained by the following mathematical formula:

$$Dm = \sqrt{\frac{2 \cdot |Xps - Xd|}{Vds \cdot Td}} \cdot Vm$$

(wherein Xps is a mold clamping start position, which is performed after a set low-pressure low-speed section, Vds is a current mold closing speed at the time of starting the deceleration section, and Vm is a set mold closing speed).

* * * * *